United States Patent [19]
Masegi et al.

[11] Patent Number: 6,060,802
[45] Date of Patent: *May 9, 2000

[54] AC GENERATOR FOR AN AUTOMOTIVE VEHICLE

[75] Inventors: Makoto Masegi; Tsutomu Shiga, both of Aichi-ken; Koichi Ihata, Okazaki, all of Japan

[73] Assignee: Denso Corporation, Kariya, Japan

[*] Notice: This patent is subject to a terminal disclaimer.

[21] Appl. No.: 09/035,814

[22] Filed: Mar. 6, 1998

[30] Foreign Application Priority Data

Sep. 25, 1997 [JP] Japan ................................. 9-260322

[51] Int. Cl.⁷ ............................ H02K 5/22; H02K 13/00; H02K 9/22
[52] U.S. Cl. ..................... 310/68 D; 310/71; 310/239
[58] Field of Search ......................... 310/68 D, 67 R, 310/279, 71, 64

[56] References Cited

U.S. PATENT DOCUMENTS

| | | | |
|---|---|---|---|
| 4,100,440 | 7/1978 | Binder et al. | 310/89 |
| 4,232,238 | 11/1980 | Saito et al. | 31/68 D |
| 4,926,076 | 5/1990 | Nimura et al. | 31/68 D |
| 4,952,829 | 8/1990 | Armbruster | 310/68 D |
| 4,957,876 | 9/1990 | Shibata et al. | 437/209 |
| 5,331,231 | 7/1994 | Koplin et al. | 310/68 D |

FOREIGN PATENT DOCUMENTS

| | | | |
|---|---|---|---|
| 56-019353 | 2/1981 | Japan | 310/68 D |
| 56-145759 | 11/1981 | Japan | 310/68 D |
| 61-154057 | 7/1986 | Japan | 310/68 D |
| 2-500630 | 3/1990 | Japan . | |
| 5-219704 | 8/1993 | Japan | 310/68 D |
| 6-046547 | 2/1994 | Japan | 31/68 D |

*Primary Examiner*—Nestor Ramirez
*Assistant Examiner*—Karl Eizo Tamai
*Attorney, Agent, or Firm*—Cushman Darby Cushman IP Group of Pillsbury; Madison & Sutro, LLP

[57] ABSTRACT

A cooling fin is fixed to a frame and mounts a plurality of rectifying elements. The cooling fin is configured into a circular ring shape separated at a cutout section. A brush holder, a connector casing and an IC regulator are disposed in this cutout section. A circumferential gap of the cutout section is smaller than three times a circumferential width of the brush container.

13 Claims, 5 Drawing Sheets

AC GENERATOR FOR AN AUTOMOTIVE VEHICLE

BACKGROUND OF THE INVENTION

The present invention relates to an AC generator (i.e., so-called alternator) for an automotive vehicle, which is preferably installed in a passenger vehicle or a truck or the like.

To reduce the aerodynamic resistance in a traveling condition, a vehicle body tends to be formed into a slant nose shape. Securing a sufficient residential space for a passenger compartment is earnestly demanded. To satisfy these requirements, engine rooms of automotive vehicles have been becoming so narrow and crowded that only a limited space is available for installing an AC generator. Meanwhile, to improve fuel economy, rotation of an engine tends to be reduced. Correspondingly, rotation of an AC generator is lowered. On the other hand, there is a need for increasing electric load for safety control devices etc. Thus, improving the generating ability of the AC generator is strongly required. In other words, a compact, powerful, and non-expensive automotive AC generator is required.

To this end, the power output may be increased by reducing the winding resistance and air gaps or by increasing the exciting current. However, this will induce heat generation at various components constituting the AC generator. Especially, a rectifying element (i.e., diode) is subjected to a large temperature increase. The rectifying element is generally used to rectify electric power when generated by a stator from AC voltage into DC voltage. To secure the reliability of this rectifying element, it is necessary to cool the cooling fin satisfactorily within a limited space. To improve the cooling performance, it is of course possible to enlarge the cooling fan so as to increase an amount of cooling air. However, solely increasing the cooling air volume will result in an increase of noise.

FIG. 4 shows an automotive AC power unit for a conventional automotive AC generator.

Cooling fins 511 and 512, used for cooling the rectifying elements, are disposed on a rear frame. An IC regulator 7 and a connector casing 8 are disposed at point-symmetrical positions with respect to the cooling fins 511 and 512, respectively. A brush holder 6 is disposed at a portion surrounded by them. An appropriate clearance is provided at a radial-inner end and a radial-outer end of each of the cooling fins 511 and 512. More specifically, as shown in FIG. 5, the radial-inner end of each cooling fin 511 or 512 is spaced from a slip ring protector 91 with a radial clearance while the radial-outer end is spaced from a rear cover 92 with another radial clearance. The cooling fins 511 and 512 have circumferential ends which are partly brought into contact with neighboring components so as to provide open spaces 93.

A central portion of each of the cooling fins 511 and 512 is sufficiently cooled by cooling air, as the cooling air is introduced from an opening provided on the rear cover 92 and flows along the surfaces of these cooling fins 511 and 512, as shown in FIG. 5. However, the cooling air does not flow at the above-described contacted end portions of the cooling fins 511 and 512. Meanwhile, the cooling air flow resistance is lowered significantly at the opened end portions of the cooling fins 511 and 512, compared with other portions where components are disposed. Thus, the introduced cooling air may directly go out through the opened end portion without interacting with the cooling fins 511 and 512. Accordingly, cooling performance is not uniformed among a plurality of diodes 513 and 514 arranged in a circumferential direction on the cooling fins 511 and 512. More specifically, the diodes 513 and 514 positioned at the circumferential ends of the cooling fins 511 and 512 are not satisfactorily cooled by the cooling air, compared with the diodes 513 and 514 positioned at the circumferential centers of the cooling fins 511 and 512.

U.S. Pat. No. 4,952,829 discloses a cooling fin for a rectifying element which has a sectorial opening at a radial-outer end of a brush holder. This arrangement will encounter with the above-described problem that the rectifying elements positioned near the opening are not sufficiently cooled because the cooling air is directly guided to the opening.

SUMMARY OF THE INVENTION

In view of the foregoing problems encountered in the prior art, the present invention has an object to provide an automotive AC generator which is capable of improving the cooling performance of rectifying elements in a crowded space accommodating a brush holder, an IC regulator and a connector casing by increasing an effective cooling area of a cooling fin while adequately maintaining the cooling performance of other components.

In order to accomplish the above-described and other related objects, the present invention provides a novel and excellent automotive AC generator characterized by the following features. A cooling fin (511, 512), fixed to a frame (42), mounts a plurality of rectifying elements (513, 514) rectifying a generated power. A brush holder (6) includes a brush container (62) accommodating a brush (61) and a brush container fixing arm (63) supporting the brush container (62). A connector casing (8) has terminals (81) for inputting and outputting electric signals from and to a vehicle electric apparatus. An IC regulator (7) adjusts an output value of the generated voltage. A circumferential width of the IC regulator is substantially identical with a circumferential width of the brush container (62). The cooling fin is configured into a circular ring shape separated at a cutout section (52). The brush holder, the connector casing and the IC regulator are disposed in the cutout section. And, a circumferential gap (B) of the cutout section is less than three times a circumferential width (A) of the brush container.

According to the above-described arrangement, the brush holder, the connector casing and the IC regulator are disposed in the cutout section of the cooling fin. This arrangement is advantageous in that the cooling fin for the rectifying element can be extensively provided along an entire circumferential region except for the brush holder. Not only the effective surface area of the cooling fin is increased, but also the cooling air can flow uniformly and effectively along the entire circumferential region. Thus, the cooling performance can be greatly improved.

The circumferential gap of the cutout section of the cooling fin has a sensitive correlation with generation of useless cooling air. In other words, the circumferential gap of the cutout section gives a large influence to the cooling performance of the rectifying elements located on the cooling fin, especially in the vicinity of the cutout section.

Hence, the inventors of the present invention have conducted a test to check the temperature increase in a rectifying element located in the vicinity of the cutout section of the cooling fin when a ratio B/A is varied. According to a test result shown in FIG. 3, the temperature of the rectifying element can be effectively suppressed when the ratio B/A is smaller than 3.

In addition, both the brush holder and the connector casing can be securely fixed to the cooling fin by using shorter fixing arms. This is advantageous in that fixing strength and vibration durability can be improved for the brush holder and the connector casing.

Preferably, the circumferential gap (B) of the cutout section is in a range of 1.5 to 2.8 times the circumferential width (A) of the brush container.

Preferably, the IC regulator (7) is connected to at least one of the brush holder (6) and the connector casing (8) with a clearance so that cooling air can flow along a surface of the IC regulator. With this arrangement, it becomes possible to effectively cool the IC regulator which is a heat generating member as well as the rectifying elements.

Preferably, the cooling fin comprises a positive-electrode fin (51 1) and a negative-electrode fin (512) arranged in parallel to each other via an insulating member (516). In this case, the positive-electrode fin is a cooling fin attached to higher-voltage side rectifying elements which serve as an upper arm of an ordinary three-phase full-wave rectifying circuit. The negative-electrode fin is a cooling fin attached to a lower-voltage side rectifying element which serves as a lower arm of this three-phase full-wave rectifying circuit. This arrangement is advantageous for the cooling air. The cooling air flows in an axial direction from a rear side of an automotive AC generator in response to a revolution of the rotor (3). The cooling air can be smoothly conveyed to the cooling fins (511, 512). This makes it possible to cool the cooling fins effectively. Furthermore, the effective area of the cooling fins can be increased. Thus, the cooling performance can be greatly improved.

Preferably, a capacitor (85) is connected between power supplying terminals (82, 82) of a rectifying circuit including the rectifying elements, and the capacitor is disposed in the cutout section (52). This arrangement is advantageous in that wiring layout can be simplified. This makes it possible to remove ripple components from a DC output voltage generated from the rectifying circuit. Furthermore, no extra space is required for the electric noise-reducing capacitor. Thus, the effective area of the cooling fin can be adequately maintained.

Preferably, the IC regulator (7) has a one-chip integrated circuit arrangement including an integrally molded cooling fin (73). This arrangement is advantageous because no regulator casing is required and, as a result, the space for the regulator can be reduced significantly. Accordingly, the effective area of the cooling fin can be increased. The cooling performance can be improved.

Reference numerals in parenthesis, added in the above description, show the correspondence to the components disclosed in a later-described preferred embodiment of the present invention. Therefore, these numerals are merely used for expediting the understanding to the present invention and not used for narrowly interpreting the scope of the present invention.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

Figure 1:
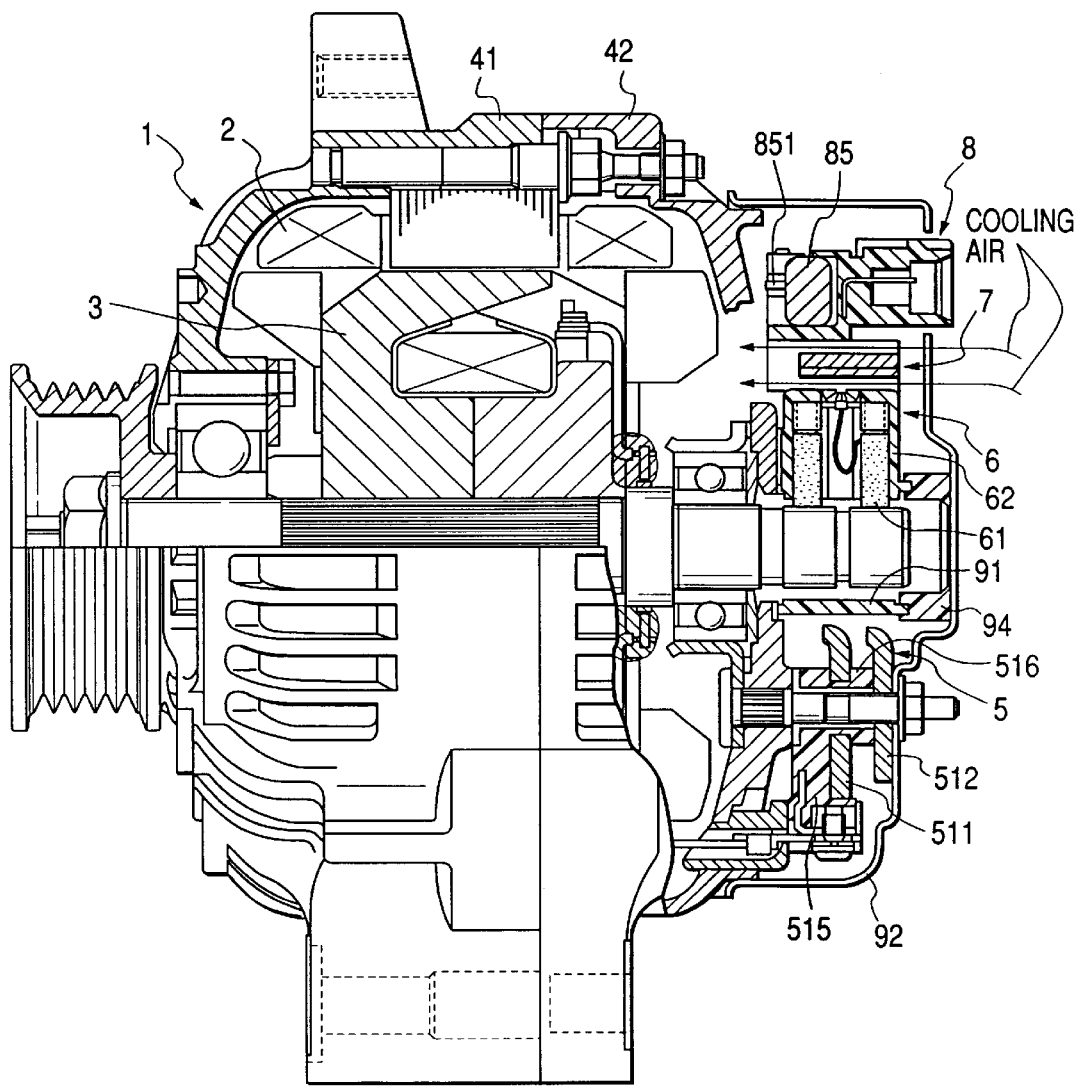
FIG. 1 is a partly cross-sectional view showing an automotive AC generator in accordance with a preferred embodiment of the present invention.

A preferred embodiment of the present invention will be explained hereinafter with reference to accompanied drawings. Identical parts are denoted by the same reference numerals throughout the drawings.

Figure 2:
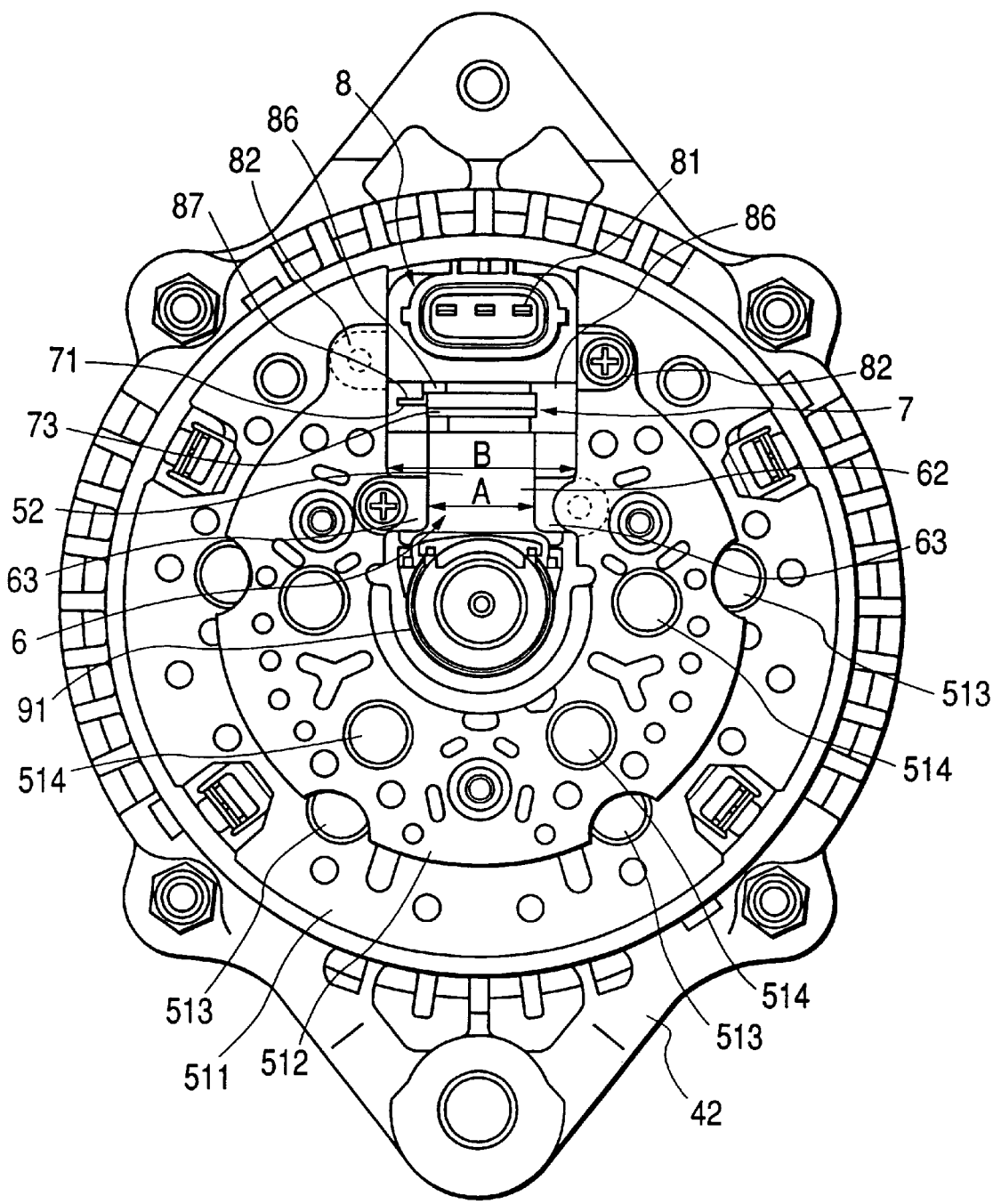
FIG. 2 is a front view showing the automotive AC generator shown in FIG. 1 under a condition where both a rear cover and a sealing ring are removed.

As shown in FIGS. 1 and 2, an automotive AC generator 1 in accordance with a preferred embodiment of the present invention comprises a stator 2 acting as an armature and a rotor 3 acting as a rotary field. Front and rear frames 41 and 42 cooperatively support the stator 2 and the rotor 3. A rectifier 5 is connected to the stator 2 to rectify an AC power generated in this AC generator 1. A brush holder 6 supports a brush 61 which supplies the field current to the rotor 3. An IC regulator 7 has a function of adjusting an output value of the generated voltage. A connector casing 8 has input and output terminals for inputting and outputting electric signals from and to a vehicle electric apparatus. A rear cover 92 is provided to close the rear end of the AC generator 1.

The rectifier 5 comprises a positive-electrode cooling fin 511, and a negative-electrode cooling fin 512. A plurality of positive rectifying element 513 are mounted on the positive-electrode cooling fin 511. A plurality of negative rectifying elements 514 are mounted on the negative-electrode cooling fin 512. A terminal base 515 and a distance sleeve 516 are provided between the positive-electrode cooling fin 511 and the negative-electrode cooling fin 512. The terminal base 515 and a distance sleeve 516 are made of a resin insulating member so as to electrically insulate the cooling fins 511 and 512. The terminal base 515 accommodates a conductive member which supplies the AC voltage generated by the stator 2 to the rectifying elements 513 and 514.

Figure 3:
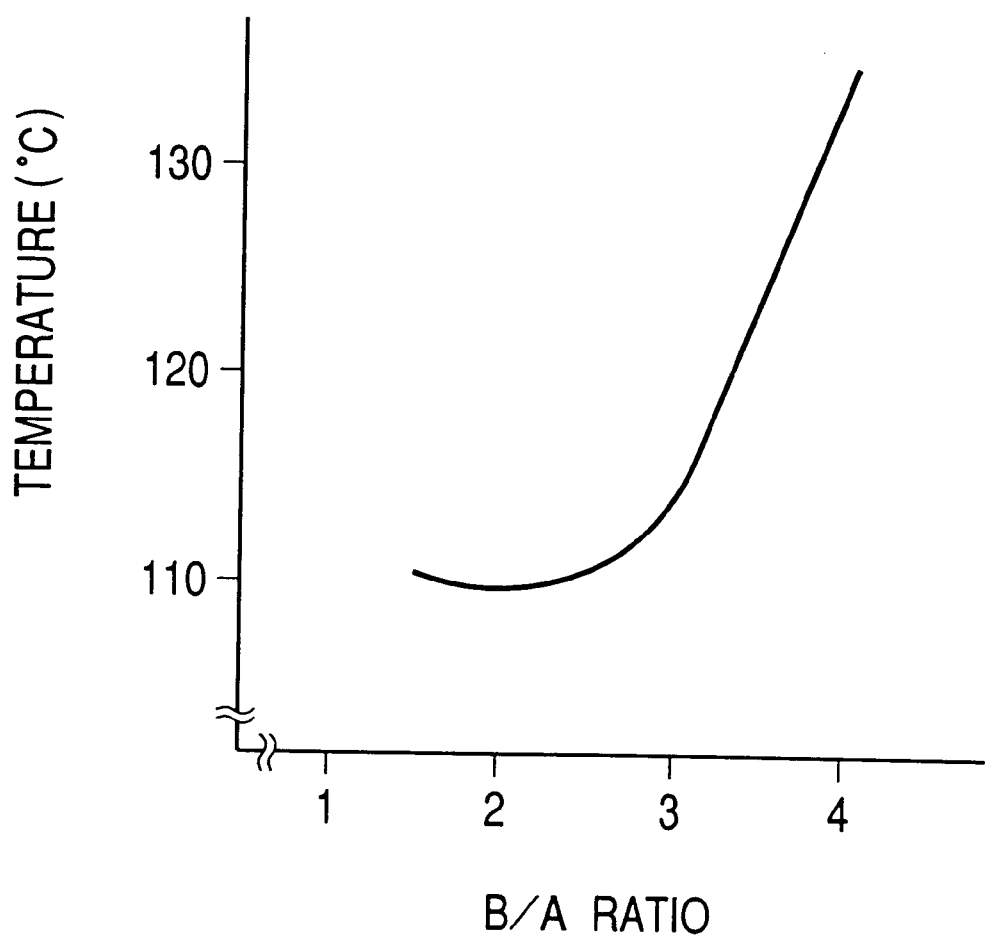
FIG. 3 is a graph showing temperature characteristics of a rectifying element used in the automotive AC generator shown in FIG. 1, obtained by conducting a test.
Figure 4:
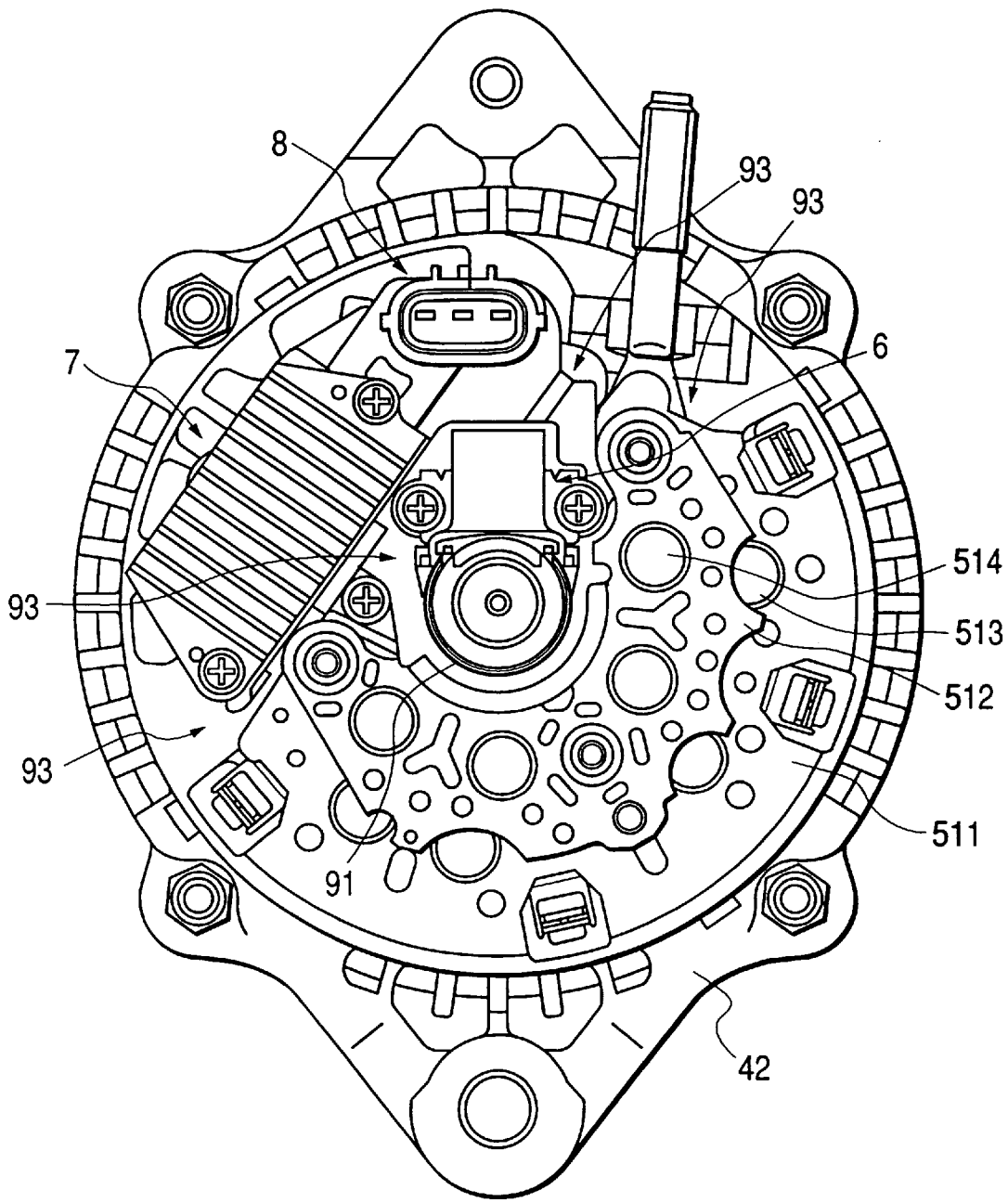
FIG. 4 is a front view showing a conventional automotive AC generator under a condition where both a rear cover and a sealing ring are removed.
Figure 5:
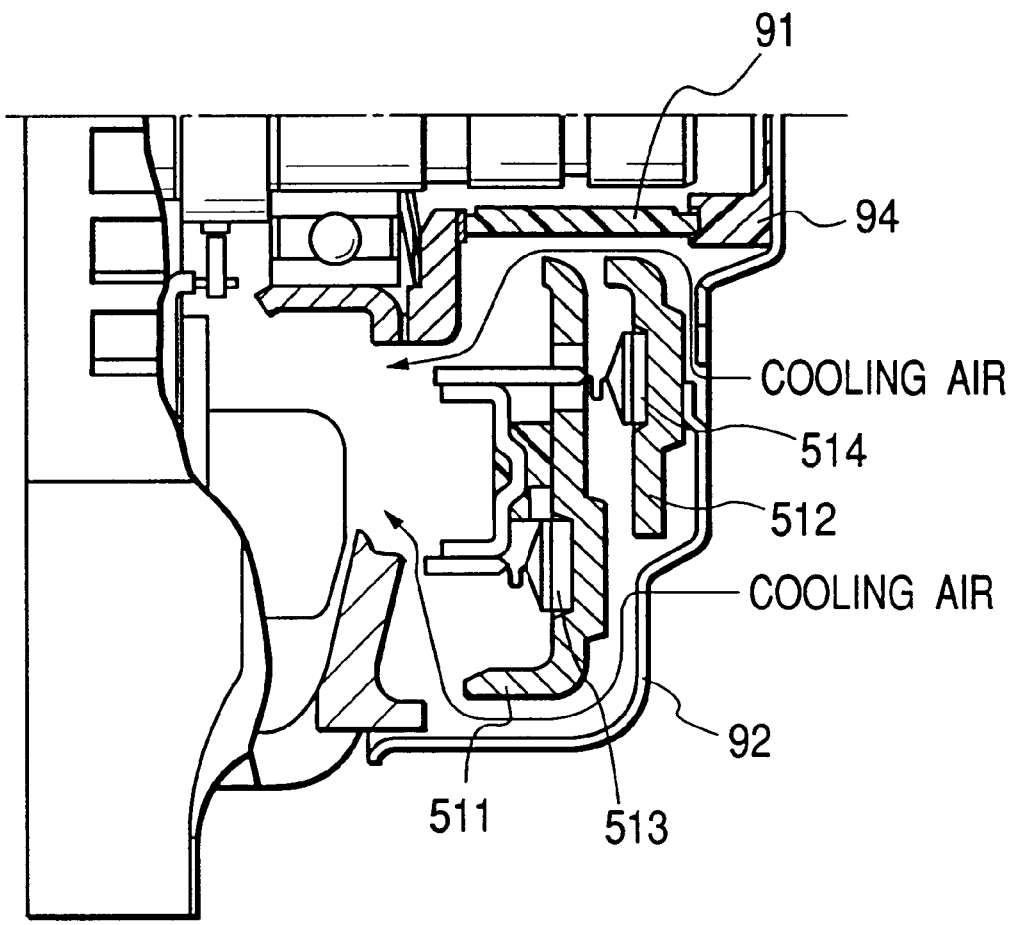
FIG. 5 is a partly enlarged cross-sectional view showing an essential part of the conventional automotive AC generator shown in FIG. 4.

The cooling fins 511 and 512 are made of heat conductive material, such as copper. Each of the cooling fins 511 and 512 is configured into a circular ring shape which is opened or separated at a cutout section 52. A circumferential gap "B" of the cutout section 52 is less than three times a circumferential width "A" of a later-described brush container 62. Preferably, the gap "B" is in a range of 1.5 to 2.8 times the width "A", as understood from the temperature characteristics of the rectifying element shown in FIG. 3 which shows the temperature increase of the rectifying element in relation to the variation of the B/A ratio. A circumferential width of IC regulator 7 is substantially identical with a circumferential width of the brush container 62. These cooling fins 511 and 512 are securely fastened to the rear frame 42 via the terminal base 515 and the distance sleeve 516 by means of appropriate fastening members.

When the stator 2 generates an AC voltage, this AC voltage is converted into a DC voltage by the plurality of rectifying elements 513 and 514 which are fixedly mounted on the cooling fins 511 and 512 by soldering or riveting. A slip ring protector 91 is interposed between a seal ring 94 and the rear frame 42 so as to surround a slip ring. The seal ring 94 is disposed at the center of an inner end face of the rear cover 92. An appropriate clearance is provided at a radial-inner end and a radial-outer end of each of the cooling fins 511 and 512. More specifically, in a radial direction, the radial-inner end of each cooling fin 511 or 512 is appropriately spaced from the slip ring protector 91 while the radial-outer end is appropriately spaced from a cylindrical inner wall of the rear cover 92.

The brush holder 6 comprises the brush container 62 accommodating the brush 61 therein and brush container fixing arms 63 supporting the brush container 62. The brush container fixing arms 63 are fixedly fastened to the positive-electrode cooling fin 511 and the negative-electrode cooling fin 512. The brush container 62 is disposed in the cutout section 52 of the cooling fins 511 and 512.

The connector casing 8 comprises terminals 81 for inputting and outputting electric signals from and to an electric device of the vehicle. The connector casing 8 is fixedly connected to the cooling fins 511 and 512 by fixing arms 82. The fixing arms 82 have a function of supplying electric power to the IC regulator 7. The terminals 81 and the fixing arms 82 are integrally molded. A capacitor 85, used for reducing the electric noise, is disposed behind the connector casing 8. Electrodes 851 of the capacitor 85 are electrically connected to intermediate portions of the molded fixing arms 82. The fixing arms 82, each made of a metallic member, are securely fastened to the positive-electrode and negative-electrode cooling fins 511 and 512 of the rectifier 5. The capacitor 85 is disposed in the cutout section 52.

The IC regulator 7 comprises a plurality of external connecting terminals 71, an IC main body (not shown) and a cooling fin 73, which are integrally molded. The IC regulator 7 is coupled with or bonded on a regulator support 86 which is located below the connector casing 8. An appropriate clearance is provided between the IC regulator 7 and the connector casing 8, so that cooling air passes along an upper surface of IC regulator 7 and a bottom surface of the connector casing 8. The connecting terminals 71 are electrically connected by welding to terminal ends 87 protruding from the molded connector casing 8. Furthermore, an appropriate clearance is provided between the IC regulator 7 and the brush holder 6, so that the cooling air passes along a lower surface of IC regulator 7 and an upper surface of the brush holder 6.

With the above-described arrangement, the brush holder 6, the IC regulator 7 and the connector casing 8 are accommodated in the slit-like cutout section 52 of the cooling fins 511 and 512. Thus, it becomes possible to increase the surface areas of the cooling fins 511 and 512, greatly improving the cooling performance. Furthermore, the cooling air can smoothly flow along the upper and lower surfaces of the IC regulator 7 which is a heat generating member as well as the rectifying elements 513 and 514.

Furthermore, the capacitor 85 can be disposed behind the connector casing 8 (i.e., at a downstream side in the cooling air flow). This arrangement is advantageous because the effective surface area of the cooling fins 511 and 512 is not reduced and the cooling air is smoothly conveyed to the stator 2.

According to the above-described embodiment, the radial-outer end of the positive-electrode cooling fin 511 is positioned outward in the radial direction than that of the negative-electrode cooling fin 512. However, when the cooling fins 511 and 512 are reversely arranged in the axial direction, it is preferable that the radial-outer end of the positive-electrode cooling fin 511 is positioned inward in the radial direction than that of the negative-electrode cooling fin 512. It is also preferable that the radial-inner ends of the cooling fins 511 and 512 are differentiated or offset.

According to the above-described embodiment, the positive-electrode cooling fin 511 is provided adjacent to the rear frame 42. However, it is possible to dispose the negative-electrode cooling fin 512 adjacent to the rear frame 42. Furthermore, it is possible to bring the negative-electrode cooling fin 512 into contact with the rear frame 42. The resin insulating member, interposed between the cooling fins 511 and 512, can be replaced by an insulating sheet or the like. In this case, it becomes possible to shorten the axial length of the rear end portion of the rectifier 5.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An automotive AC generator comprising:
   a brush holder including (i) a brush container housing a brush, said brush for generating power, and (ii) a brush container fixing arm supporting said brush container;
   a cooling fin fixed to a frame of said generator and mounting, a plurality of rectifying elements rectifying the generated power, said cooling fin cooling the rectifying elements and fixedly fastened to said brush container fixing arm;
   a connector casing connected to said cooling fin and having terminals for inputting and outputting electric signals from and to a vehicle electric apparatus; and
   an IC regulator arranged in the vicinity of the brush container and adjusting an output voltage of the generated power, a circumferential width of said IC regulator being substantially identical to a circumferential width of said brush container,
   wherein said cooling fin is configured into a circular ring shape with a cutout section, said cutout section being defined along two radially extending parallel edges of said cooling fin,
   said brush holder, said connector casing, and a cooling fin of said IC regulator are disposed in said cutout section, and
   a clearance between said two radially extending parallel edges of said cooling fin is less than three times the circumferential width of said brush container.

2. The automotive AC generator in accordance with claim 1, wherein said clearance between said two radially extending parallel edges of said cooling fin is in a range of 1.5 to 2.8 times said circumferential width of said brush container.

3. The automotive AC generator in accordance with claim 1, wherein said IC regulator is connected to at least one of said brush holder and said connector casing with a clearance so that cooling air can flow in an axial direction along a surface of said cooling fin of said IC regulator.

4. The automotive AC generator in accordance with claim 1, wherein a capacitor is connected between power supplying terminals of a rectifying circuit including said rectifying elements, and said capacitor is disposed in said cutout section so that said capacitor does not reduce an axially extending cooling air passage formed by other components.

5. The automotive AC generator in accordance with claim 1, wherein said IC regulator has a one-chip integrated circuit arrangement including an integrally molded cooling fin.

6. The automotive AC generator in accordance with claim 1, wherein said clearance between said two radially extending parallel edges of said cooling fin is in a range of 1.5 to 2.8 times said circumferential width of said brush container, and said IC regulator is connected to at least one of said brush holder and said connector casing with a clearance so that cooling air can flow in an axial direction along a surface of said cooling fin of said IC regulator.

7. The automotive AC generator in accordance with claim 1, wherein said clearance between said two radially extending parallel edges of said cooling fin is in a range of 1.5 to 2.8 times said circumferential width of said brush container, a capacitor is connected between power supplying terminals of a rectifying circuit including said rectifying elements, and said capacitor is disposed in said cutout section so that said capacitor does not reduce an axially extending cooling air passage formed by other components.

8. The automotive AC generator in accordance with claim 1, wherein said clearance between said two radially extending parallel edges of said cooling fin is in a range of 1.5 to 2.8 times said circumferential width of said brush container, and said IC regulator has a one-chip integrated circuit arrangement including an integrally molded cooling fin.

9. The automotive AC generator in accordance with claim 1, wherein said clearance between said two radially extending parallel edges of said cooling fin is in a range of 1.5 to 2.8 times said circumferential width of said brush container, said IC regulator is connected to at least one of said brush holder and said connector casing with a clearance so that cooling air can flow in an axial direction along a surface of said cooling fin of said IC regulator, and said cooling fin comprises a positive-electrode fin and a negative-electrode fin arranged in parallel to each other via an insulating member.

10. The automotive AC generator in accordance with claim 1, wherein said clearance between said two radially extending parallel edges of said cooling fin is in a range of 1.5 to 2.8 times said circumferential width of said brush container, said IC regulator is connected to at least one of said brush holder and said connector casing with a clearance so that cooling air can flow in an axial direction along a surface of said cooling fin of said IC regulator, a capacitor is connected between power supplying terminals of a rectifying circuit including said rectifying elements, and said capacitor is disposed in said cutout section so that said capacitor does not reduce an axially extending cooling air passage formed by other components.

11. The automotive AC generator in accordance with claim 1, wherein said clearance between said two radially extending parallel edges of said cooling fin is in a range of 1.5 to 2.8 times said circumferential width of said brush container, said IC regulator is connected to at least one of said brush holder and said connector casing with a clearance so that cooling air can flow in an axial direction along a surface of said cooling fin of said IC regulator, and said IC regulator has a one-chip integrated circuit arrangement including an integrally molded cooling fin.

12. The automotive AC generator in accordance with claim 1, wherein said clearance between said two radially extending parallel edges of said cooling fin is in a range of 1.5 to 2.8 times said circumferential width of said brush container, said IC regulator is connected to at least one of said brush holder and said connector casing with a clearance so that cooling air can flow in an axial direction along a surface of said cooling fin of said IC regulator, and said cooling fin comprises a positive-electrode fin and a negative-electrode fin arranged in parallel to each other via an insulating member, and said IC regulator has a one-chip integrated circuit arrangement including an integrally molded cooling fin.

13. The automotive AC generator in accordance with claim 1, wherein said clearance between said two radially extending parallel edges of said cooling fin is in a range of 1.5 to 2.8 times said circumferential width of said brush container, said IC regulator is connected to at least one of said brush holder and said connector casing with a clearance so that cooling air can flow in an axial direction along a surface of said cooling fin of said IC regulator, said cooling fin comprises a positive-electrode fin and a negative-electrode fin arranged in parallel to each other via an insulating member, a capacitor is connected between power supplying terminals of a rectifying circuit including said rectifying elements, and said capacitor is disposed in said cutout section so that said capacitor does not reduce an axially extending cooling air passage formed by other components, and said IC regulator has a one-chip integrated circuit arrangement including an integrally molded cooling fin.

\* \* \* \* \*

UNITED STATES PATENT AND TRADEMARK OFFICE
CERTIFICATE OF CORRECTION

PATENT NO.   : 6,060,802
DATED        : May 9, 2000
INVENTOR(S)  : Masegi et al.

It is certified that error appears in the above-identified patent and that said Letters Patent is hereby corrected as shown below:

Title page,
Please delete "[*] Notice:  This patent is subject to a terminal disclaimer"

Signed and Sealed this

Twenty-eighth Day of August, 2001

Attest:

*Attesting Officer*

NICHOLAS P. GODICI
*Acting Director of the United States Patent and Trademark Office*